July 16, 1957 M. ALIMANESTIANO 2,799,406
VEHICLE PARKING APPARATUS
Original Filed July 21, 1951 8 Sheets-Sheet 4

Mihai Alimanestiano
INVENTOR.

BY Murray Robinson
ATTORNEY

July 16, 1957   M. ALIMANESTIANO   2,799,406
VEHICLE PARKING APPARATUS
Original Filed July 21, 1951   8 Sheets-Sheet 7

Mihai Alimanestiano
INVENTOR.

BY Murray Robinson
ATTORNEY

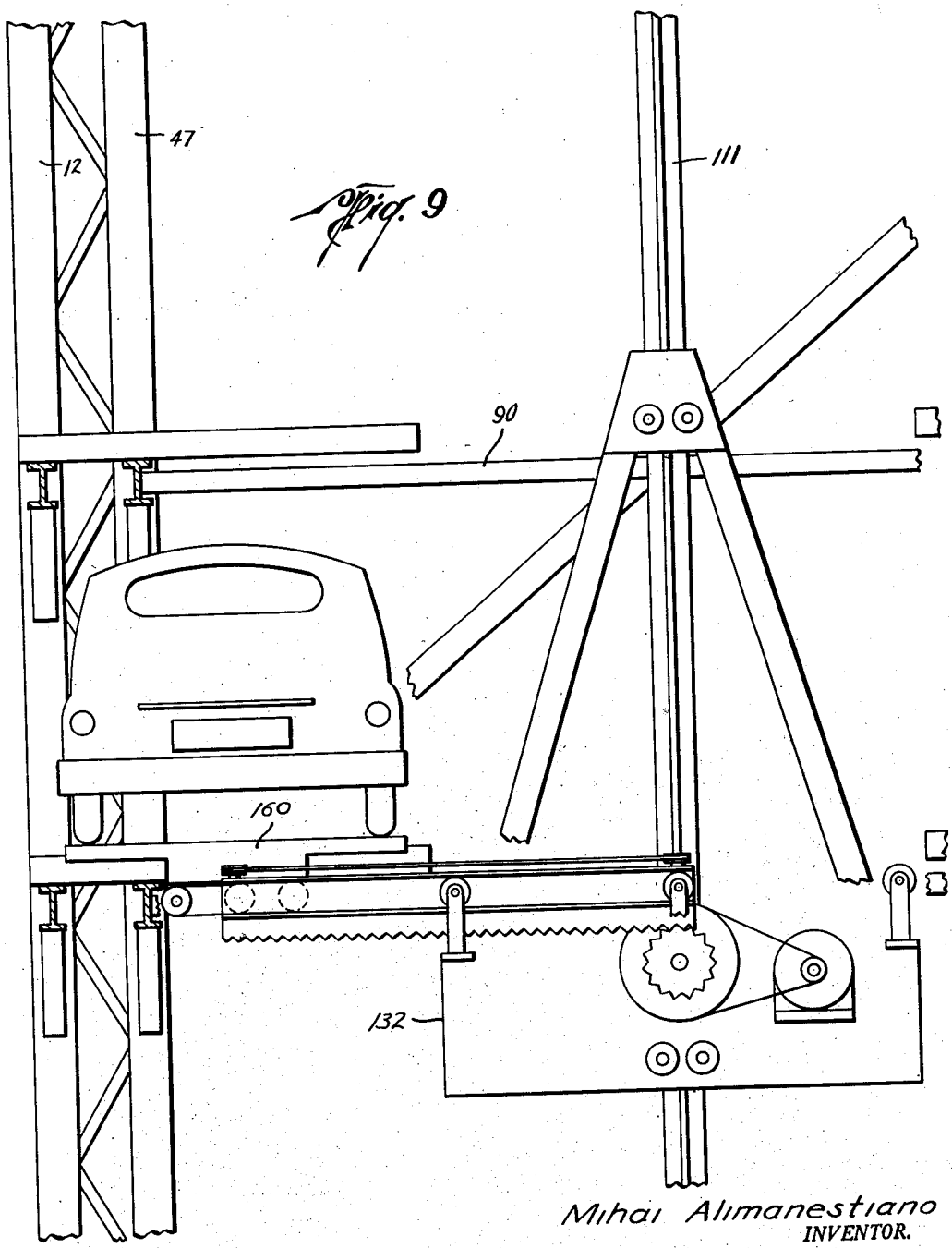

United States Patent Office 2,799,406
Patented July 16, 1957

2,799,406

VEHICLE PARKING APPARATUS

Mihai Alimanestiano, Houston, Tex., assignor, by direct and mesne assignments, to Process & Patent Corporation, New York, N. Y., a corporation of New York Continuation of application Serial No. 237,970, July 21, 1951. This application June 10, 1954, Serial No. 435,710

5 Claims. (Cl. 214—16.1)

This invention pertains to apparatus for parking vehicles and more particularly to an apparatus for storing a plurality of automobiles at different levels provided with a means to transfer the automobiles from one level to another as received and delivered. An apparatus of this general type is shown in my prior copending application S. N. 97,021 filed June 3, 1949, entitled "Apparatus for Parking Automobiles."

The present application is a continuation of my prior copending application S. N. 237,970, entitled Vehicle Parking Apparatus, filed July 21, 1950, now abandoned, which was a continuation in part of S. N. 97,021, now Patent 2,647,647.

It is an object of this invention to provide such an apparatus which will occupy a minimum horizontal area, particularly at ground level.

It is another object of the invention to provide such an apparatus which will require a minimum of material and labor.

It is a further object of the invention to provide such an apparatus that will have a maximum strength and rigidity for the amount of material and labor used.

Still another object of the invention is to provide such an apparatus in which the parked automobiles are protected against damage due to material dropping from above.

Yet another object of the invention is to provide such an apparatus in which it is easy to drive the automobiles into and out of the apparatus.

For a detailed description of a preferred embodiment of the invention, reference will now be made to the accompanying drawings wherein:

Figure 9 is a vertical section viewed from the rear of the apparatus showing a portion thereof that is on the right side of Figure 1.

Figure 1:
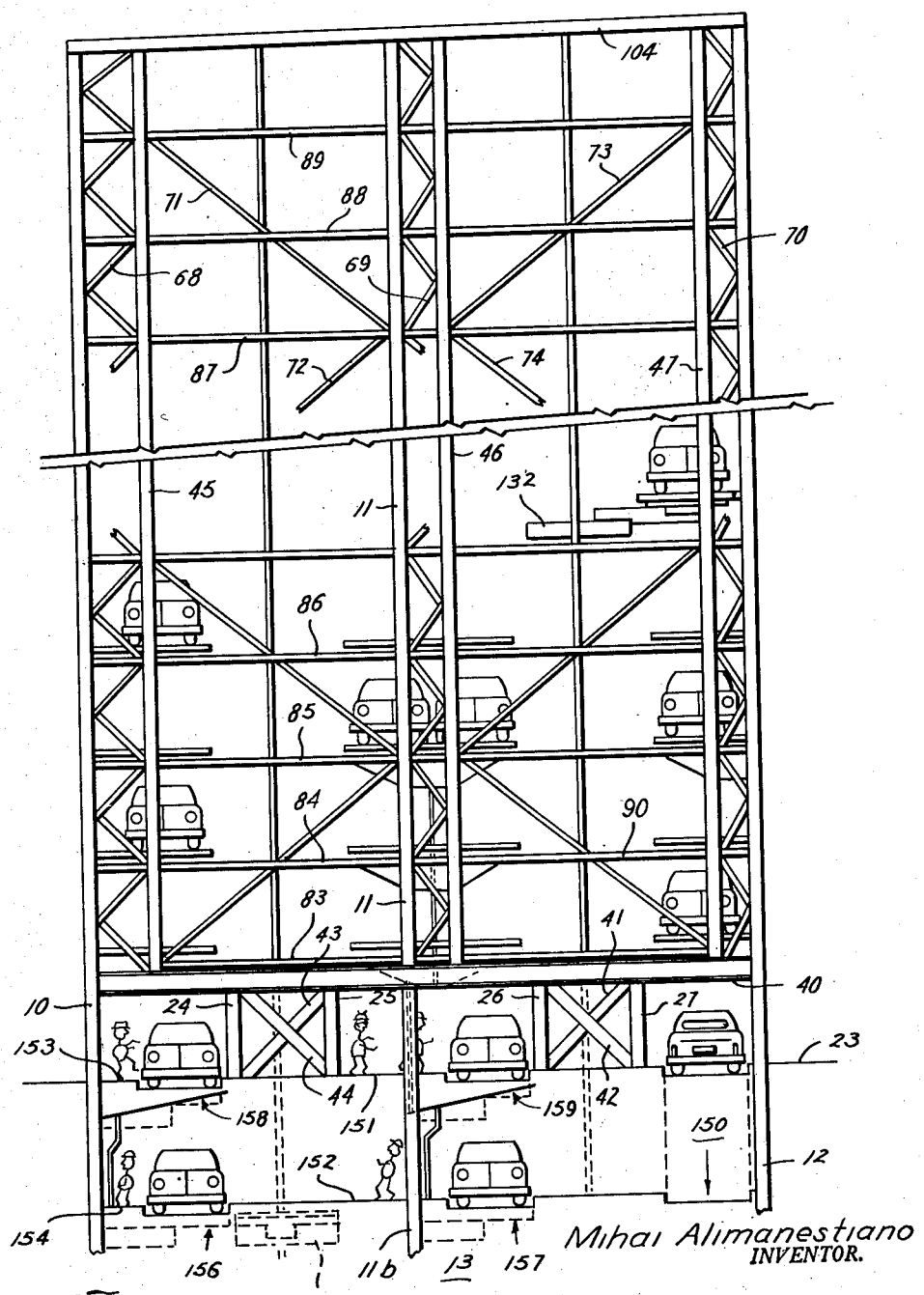
Figure 1 is a front elevation of an apparatus embodying the invention.

Referring now to Figures 1 through 5, the apparatus comprises a steel framework rising from the ground as a tower with a basement below. The framework includes vertical columns, horizontal girders and beams, and diagonal braces. In general these members are of I or H cross section although other sections may be used where appropriate. These members are secured together by welding and by rivets and plates not shown. The framework is protected against rusting by a coat of coal tar enamel or other heavy paint wherever it is not reinforced by an outer covering of concrete. The framework is supported on piling (not shown) driven below ground level.

The framework comprises columns 10, 11b, 12, 13, 14b, 15, 16, 17b, 18, 19, 20b, 21 rising from the subbasement 22. From the ground level, indicated at 23 rise additional columns 24 through 39. Four heavy girders such as that shown at 40 run transversely across the framework at the level of the second floor connecting all the columns in transverse rows. The columns 24 through 39 end at the second floor. They are provided with diagonal bracing as shown at 41, 42, 43, 44. The column studs 11b, 14b, 17b, 20b also end at the second floor.

Rising from the second floor are four columns 11, 14, 17, and 20 in line with columns 11b, 14b, 17b and 20b below. In addition there are twelve additional columns 45 through 56, best shown in Figure 5. Columns 45–56 are tied to columns 10 through 21 by diagonal bracing such as that indicated at 68, 69, 70 forming pairs of columns, each pair including one column in the 10–21 group and the adjacent column in the 45–56 group. The respective pairs are tied together by diagonal bracing in the transverse plane such as shown at 71, 72, 73, 74.

Figure 2:
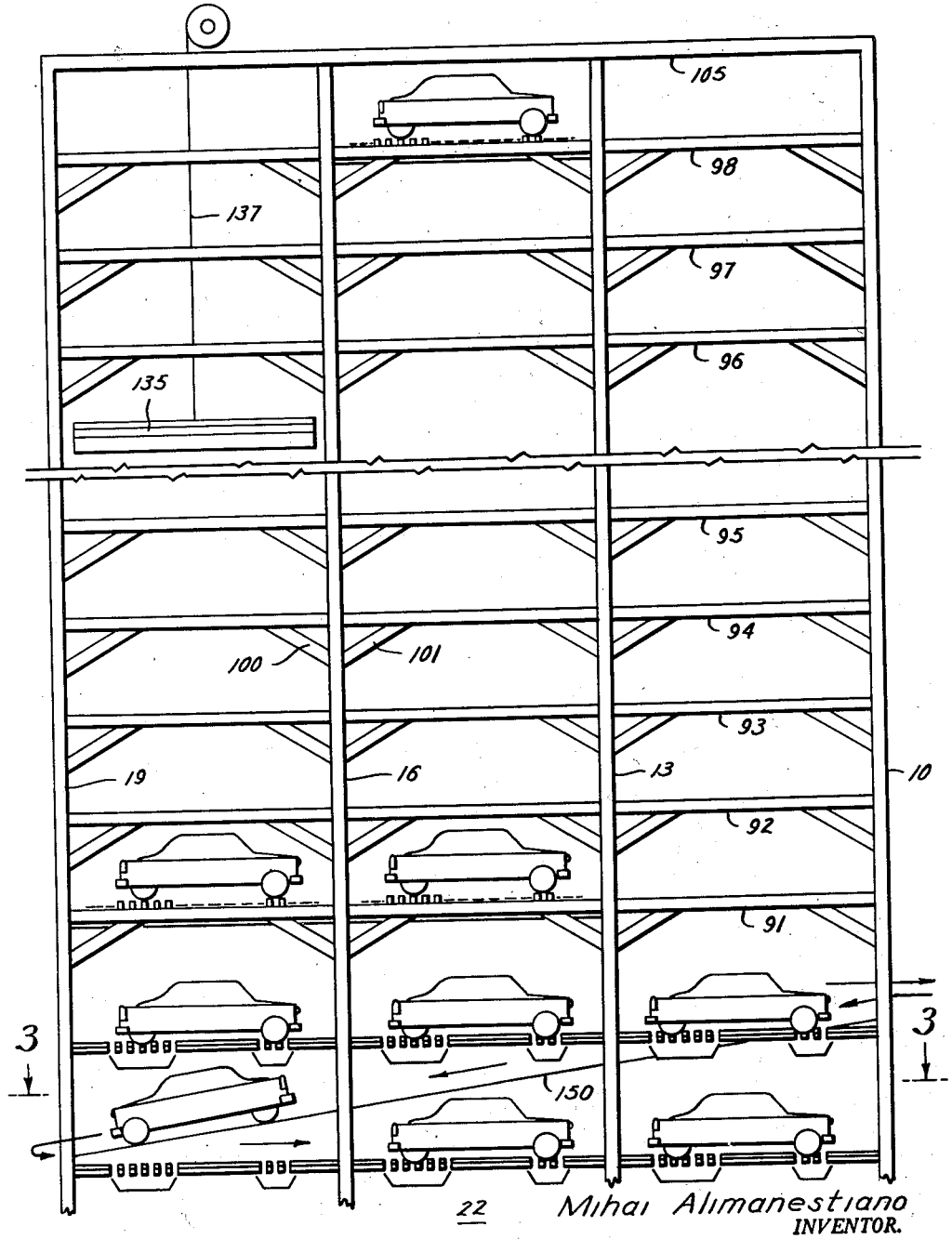
Figure 2, is a left side elevation.
Figure 3:
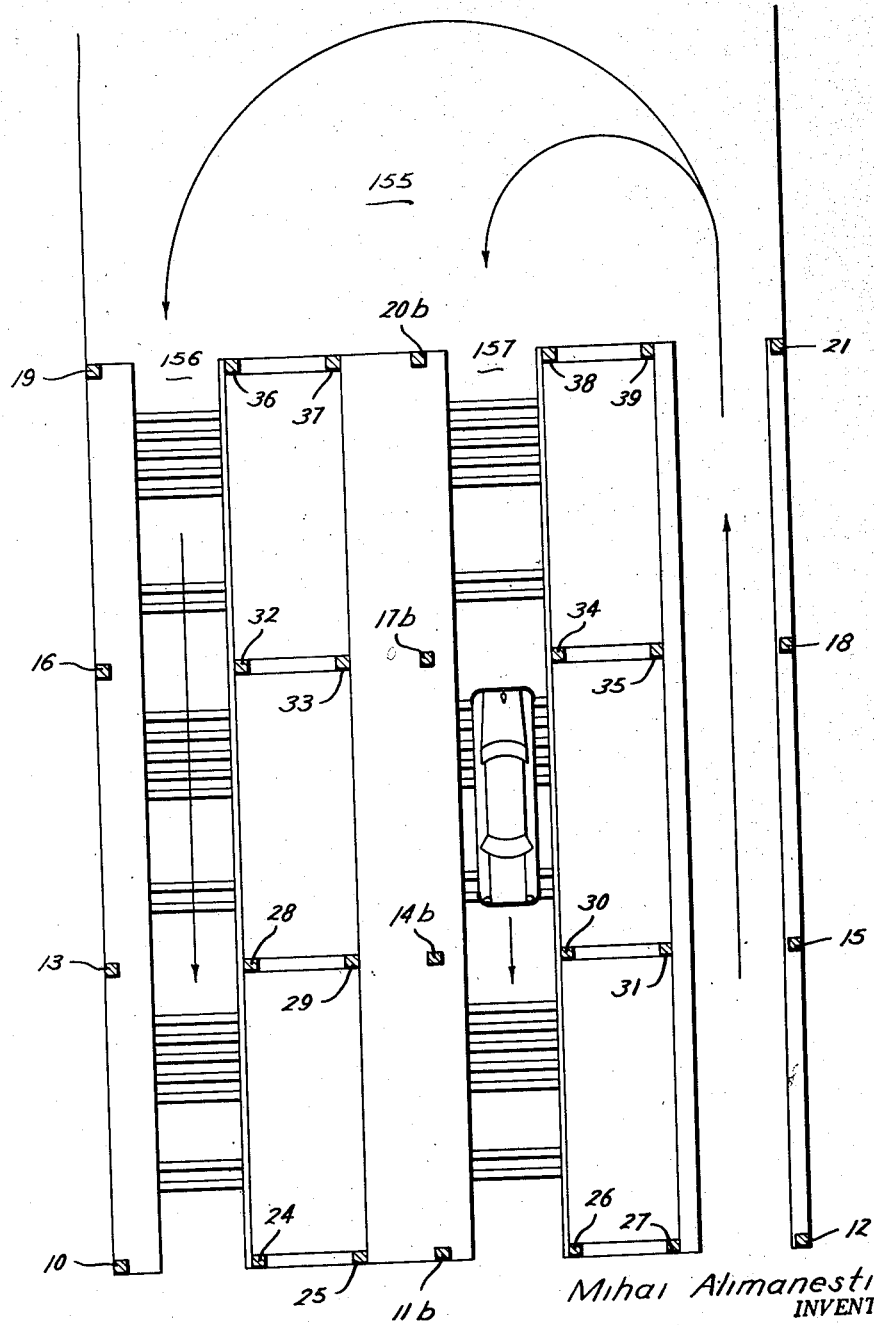
Figure 3 is a horizontal section viewed from above showing the basement plan of the apparatus.
Figure 4:
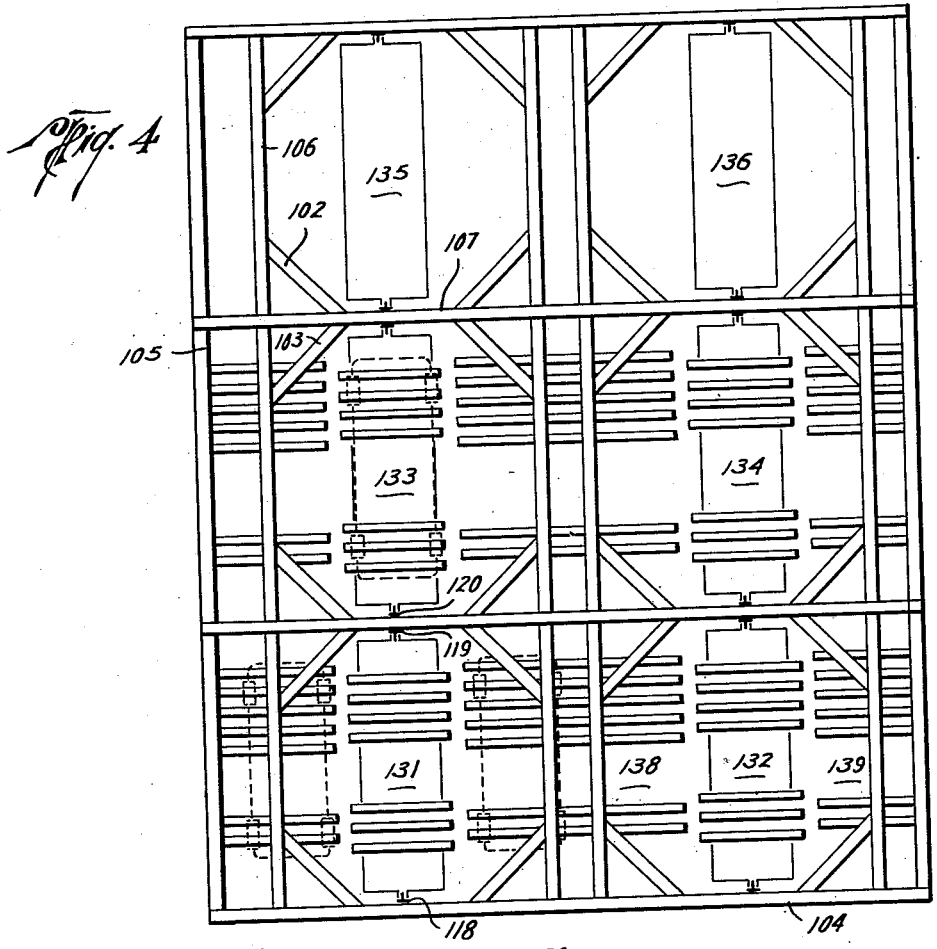
Figure 4 is a partly schematic plan view of the top of the apparatus, certain parts of the elevator hoist being omitted.
Figure 5:
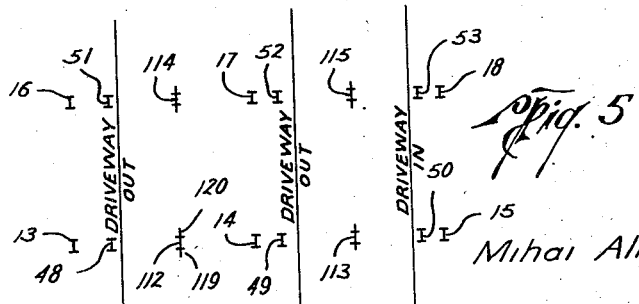
Figure 5 is a schematic horizontal section through the upper part of the apparatus showing the disposition of the columns relative to the driveways in the basement and at ground level.

Each transverse row of columns is connected by horizontal beams or stringers at each level above the first floor such as shown at 83, 84, 85, 86, 87, 88, 89, 90, and each longitudinal or fore and aft row of columns is connected at each level above the first floor by horizontal beams such as shown at 91, 92, 93, 94, 95, 96, 97, 98. In vertical planes underneath each of these beams is disposed diagonal bracing such as shown at 100 and 101 (Figure 2). In the same horizontal planes as these beams are diagonal braces such as shown at 102 and 103 (Figure 4). Heavy girders such as those shown at 104, 105, 106, and 107 connect the tops of the columns.

Midway between adjacent pairs of columns of the 10–21 and 45–56 groups in the transverse planes are columns 110–117 which carry elevator guide rails such as those shown at 118, 119, and 120. In each of the six spaces betweeen the pairs of adjacent rails in the longitudinal planes runs an elevator as shown at 131–136 in Figure 4. Suitable means including cables such as that shown at 137 are provided to raise and lower the elevators. At each level there is a pair of shelves disposed on opposite sides of the elevator shafts, as shown for example at 138, 139 in Figure 4. That part of the framework encompassing each elevator and its adjoining shelves and supporting columns is termed a tower. While the present embodiment comprises but six towers disposed two in each transverse row and three in each longitudinal row, the structure can be repeated indefinitely in both longitudinal and transverse directions. Thus, while the apparatus herein described may be designated as a 2 by 3 structure, any combination is possible, designated generally as an *m* by *n* structure where *m* is the number of towers in each transverse row and *n* is the number in each longitudinal row.

There are no shelves at the ground and street levels on one side of the elevator in each tower. The longitudinally extending spaces thus left are occupied by a ramp or inclined driveway 150, preferably located in a space adjacent the exterior of the apparatus as shown, and by walkways 151, 152. The longitudinal row of pairs of columns 10, 45; 13, 48; 16, 51; 19, 54; on the opposite side of the apparatus from the driveway is somewhat wider than the center longitudinal row 11, 46; 14, 49; 17, 52; 20, 55; in order to leave space for walkways 153, 154 which are necessary because there are no adjoining towers on this side to provide such walkways. On the driveway side of the apparatus the longitudinal row of pairs of columns 12, 47; 15, 50; 18, 53; 21, 56; is not as wide as the center row since the driveway row supports shelves on only one side. A 2, 3 structure as shown has one narrow longitudinal row of pairs of columns, one wide row, and one row of intermediate width. A wider structure would have additional rows of the intermediate width.

Automobiles enter the apparatus from the front and descend driveway 150 to the basement area 155 (Figure 3) behind the framework, turn around, and drive onto one of the shelfways 156, 157. These shelfways are comprised of shelves as in the upper parts of the framework but interconnected so that an automobile can drive over them and from one to another. Once over a shelf part of a shelfway, the automobile is stopped and the occupants can get out onto the adjacent walkway 152 or 154. A stairway not shown in provided to enable them to get back up to the ground level and out.

As described in my prior application S. N. 97,021 and as shown in Figures 4–9 hereof, each of the shelves comprises a plurality of spaced apart parallel cantilever beams and each elevator carrys a conveyor, such as shown at 160 in Figure 9, having similar beams adapted to be projected horizontally into meshing engagement with the shelf beams at either side of the elevator and load is transferred between shelf and conveyor by raising or lowering the conveyor. Automobiles parked on the shelves of the shelfways at the basement are removed by the elevators and parked on shelves above the first floor. When the owners call for their automobiles the elevators bring them down and park them on the shelves of the shelfways 158, 159 at the ground level. The owners approach their automobiles via walkways 151, 153 and drive them away over the shelfways out the front of the apparatus.

Figure 6:
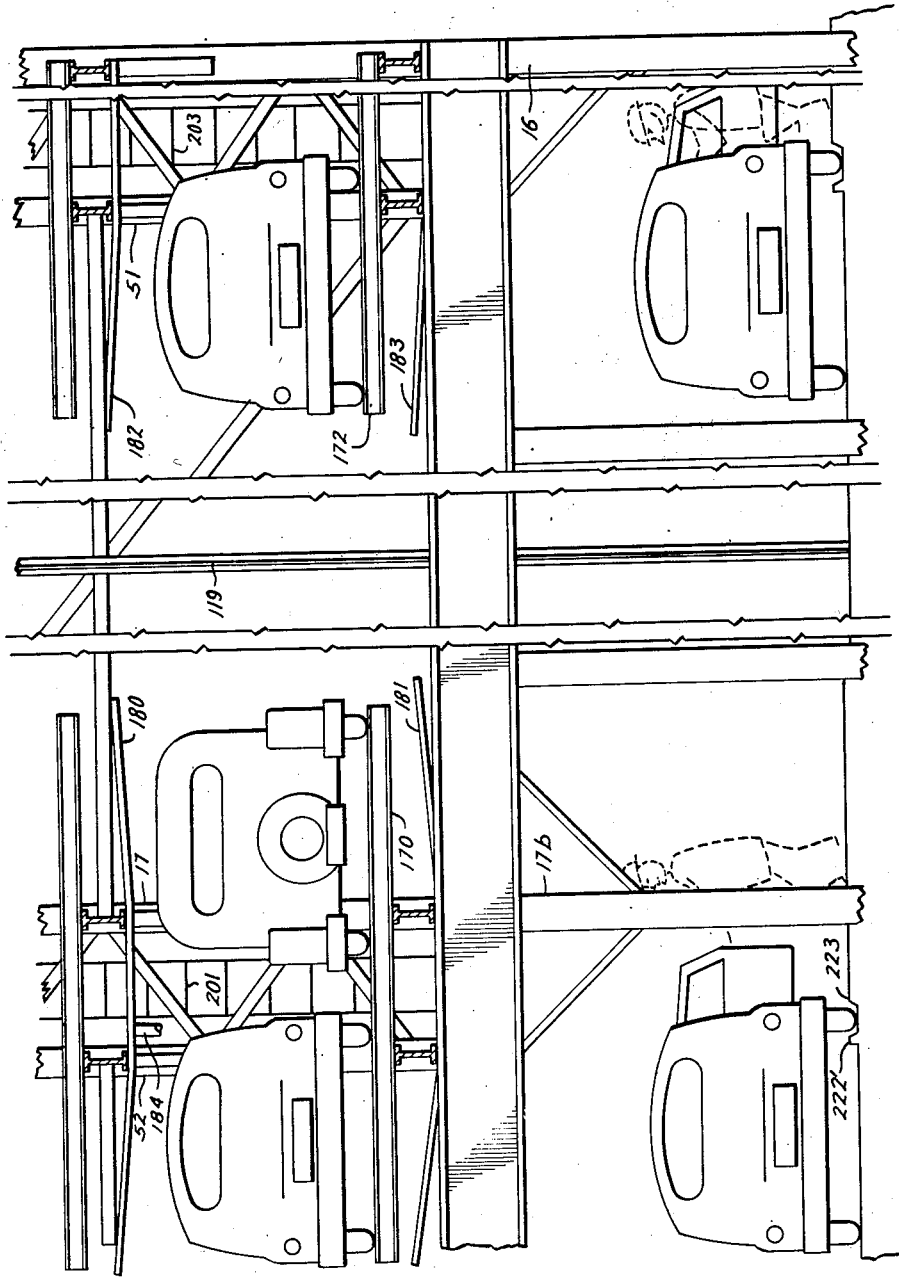
Figure 6 is a rear view of a portion of the apparatus at the ground level and level thereabove, this latter level being hereinafter referred to as the second level or second floor from analogy to the second floor of an ordinary building.
Figure 7:
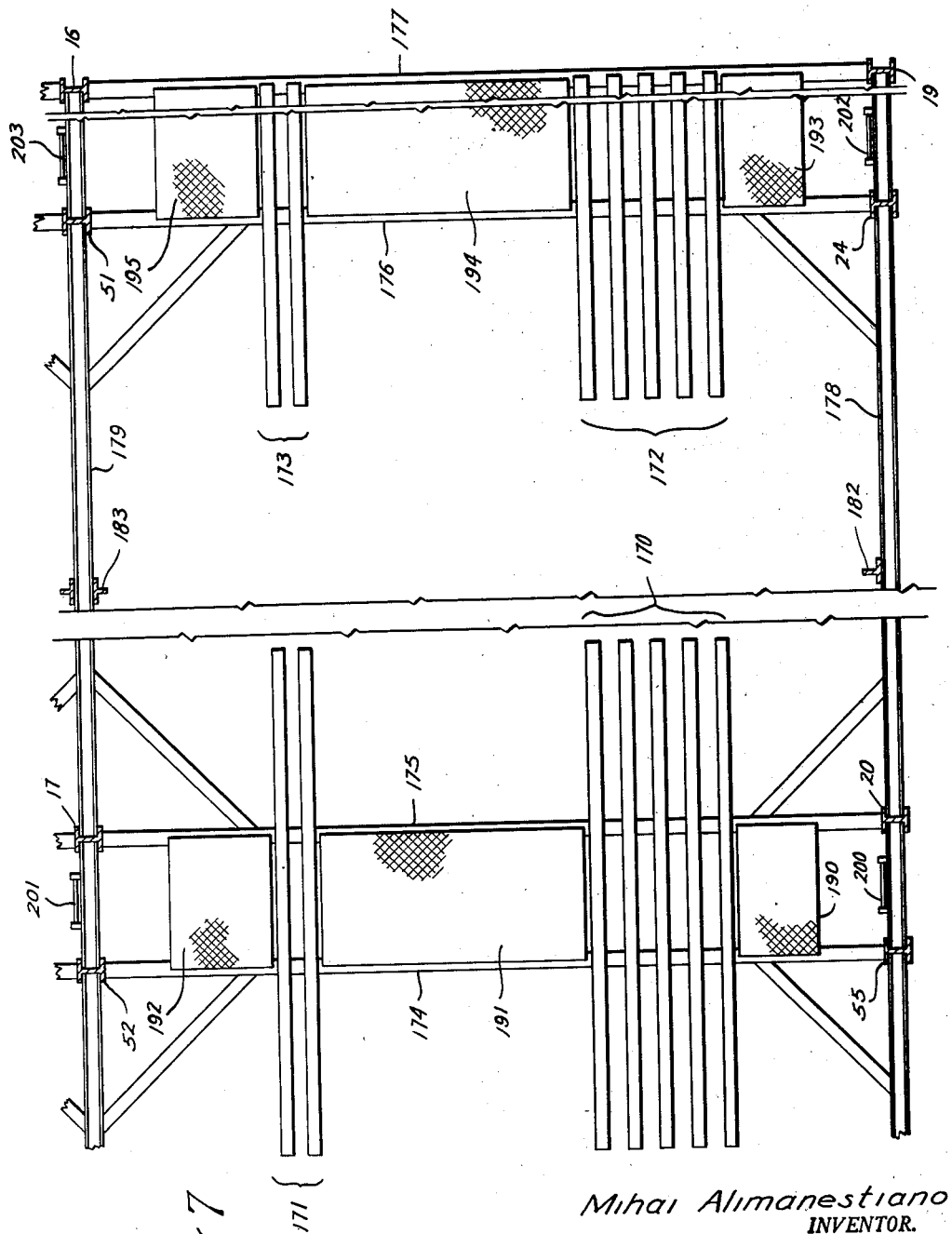
Figure 7 is a horizontal section showing a plan view of the second level oriented to correspond to Figure 6.
Figure 8:
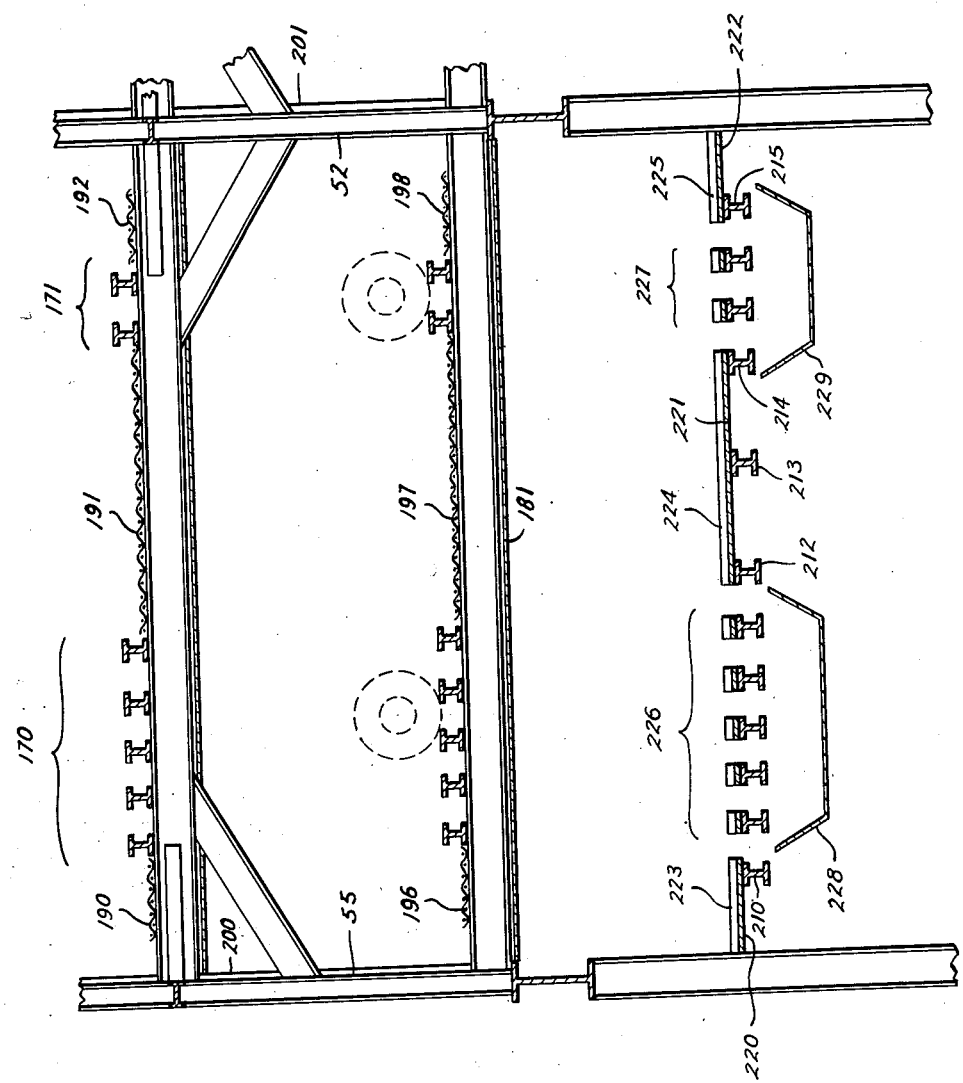
Figure 8 is vertical section showing a side view of a portion of the ground and second levels and oriented the same as Figures 6 and 7.

Referring now more particularly to Figures 6, 7, and 8, there are shown the details of the shelf assemblies and other details of construction of the framework. Each of the shelf beams such as those, shown at 170, 171, and 172, 173 are secured to the top of two horizontal beams or joists 174, 175 and 176, 177. The latter horizontal beams are I beams with their webs vertical. The shelf beams are also I beams with vertical webs. The beams of each shelf are divided into two groups to support the front and rear wheels of an automobile. The beams of a shelf adjoining a side of the framework such as 172, 173 stop at the outermost horizontal beam 177. The beams of interior shelves such as 170, 171, continue across both horizontal beams 174, 175 and extend an equal distance beyond to form a shelf in the next tower, thus forming what may be termed double-shelves.

The horizontal beams 178, 179, to which the elevator guide rails 182, 183 are secured are I beams placed with their webs in a horizontal plane to provide maximum rigidity with respect to horizontal movement so that the beams of the conveyor on the elevator will always accurately mesh with the shelf beams. The horizontal beams in line with beams 178, 179, are similarly placed, as are also all other similarly situated beams such as 83–90 shown in Figures 1 and 9.

The main columns, e. g. those shown at 19, 54, 20, 55, 16, 51, 17, 52, are all placed with their webs perpendicular to the lengths of the shelf beams. This better enables them to take the bending moment due to the diagonal knee braces connecting them to the horizontal beams, e. g. 174, 175, 176, 177. Also, the flanges of the columns are placed in planes parallel to those of the horizontal beams supporting the elevator guide rails so they can be easily connected. The use of two horizontal beams, e. g. 174, 175 and 176, 177 to support each shelf beam eliminates the necessity for knee braces under the shelf beams and eliminates any bending moment on said main columns in the transverse plane of the structure. It is also to be noted that the automobiles are parked so as to overlap one of the horizontal shelf supporting beams, thereby in part balancing out the moments on the shelf beams.

Secured beneath the horizontal beams supporting the shelf beams are catch pans such as those shown at 180, 181, 182, 183. Drainpipes such as those shown at 184 connect the catch pans to a sewer at ground level. Secured on top of these horizontal beams are floor plates such as shown at 190, 191, 192, 193, 194, 195, 196, 197, 198, which enable a workman to gain access to the shelves. Ladders, as shown at 200, 201, 202, 203, are provided between the pairs of columns to enable workman to climb to the upper levels.

At the ground and basement levels additional cantilever beams are provided alongside of the shelf beams as shown for example in Figure 8 at 210–215. Extending over the top of these additional beams up to the shelf beams are plates 220, 221, 222, over which an automobile can travel. Along the supported part of each shelfway thus formed by these plates are pairs of guide rails as shown at 223, 224, 225, and 222' (see Figure 6). Short guide elements are disposed on top of each of the shelf beams as shown at 226, 227. Catch pans 228 and 229 are disposed beneath the shelf beams.

From the foregoing description it will be apparent how the objects of the invention are attained. By utilizing one shelf space of each tower for either a driveway or walkway at the entrance and exit levels it is unnecessary to provide space between the towers for this purpose and the adjacent pairs of shelf supporting columns of two adjoining towers are combined into one pair as shown at 11, 46; 14, 49; 17, 52; 20, 55; and the load on one shelf will balance that on the other. By receiving and delivering automobiles at different levels, any loss of speed of operation due to such useage of part of the lower shelf spaces for driveway and walkways is fully compensated. By turning at the basement level, the valuable commercial space at the ground level is saved.

The use of pairs of columns to support the shelves eliminates bending moment on the individual columns which are merely placed in tension or compression. The diagonal bracing between the columns in each pair balances out the tension in one column against the compression in the other column of a pair so that there is no couple transmitted to the girders at the base of the columns. The elimination of the bending moment on the columns in the transverse planes, i. e., vertical parallel to the lengths of the shelf beams, makes it practical to turn the columns with their webs longitudinal of the framework i. e. perpendicular to the shelf beams, so as better to take the bending moment due to the knee braces beneath the horizontal shelf supporting beams. Turning the columns into that orientation enables their flanges to be parallel to the flanges of the horizontal beams which support the elevator guide rails, the latter being disposed with their webs horizontal to take the side thrust bending moment of the elevator. Having the column and the latter beams disposed with their flanges in parallel planes makes it easy to connect them together.

The provision of catch pans beneath the shelves prevents one car from dripping grease and oil onto the car below and generally protects each car from injury due to falling objects. Some protection against rain is afforded.

The provision of shelfways with guide rails enables a person to drive an automobile onto a receiving shelf without steering and the slight drop from the plates of the shelfway onto the shelf beams enables the driver to know when he has properly positioned his car.

Although an apparatus has been described in which are provided different levels for entrance and exit of automobiles and in which the automobiles are both received and delivered at the front, there being turning space provided at the rear, entrance and exit could be made at the same level and the turning area could also be at the same level or could be eliminated if the apparatus should abut on a street at the rear as well as at the front. For example, automobiles could be both received and delivered via shelfways 158, 159, or received via shelfway 158 and delivered via shelfway 159.

While a preferred embodiment of the invention has been shown and described it is obvious that many modifications thereof can be made by one skilled in the art without departing from the spirit of the invention and it is desired to protect by Letters Patent all forms of the invention falling within the scope of the following claims:

I claim:

1. Apparatus for parking automobiles comprising two towers, each tower comprising a plurality of pairs of co-level horizontally spaced shelves, said pairs of shelves being spaced apart vertically, the horizontal spaces between the sides of said shelves defining an elevator shaft, each shelf comprising a plurality of elongated members horizontally spaced apart, the sides of each shelf running transverse to said members and the ends of each shelf being parallel to the lengths of said members, a conveyor comprising a plurality of elongated members horizontally spaced apart and adapted to intermesh with said members of any one of said shelves, means to move the conveyor up and down the elevator shaft adjacent said shelves with the lengths of the conveyor members parallel to the lengths of the shelf members, means to move the conveyor horizontally back and forth between the elevator shaft and the space occupied by any one of said shelves, means at an end of one of said shelves to support an automobile driven onto and off of the shelf to the ground adjacent the apparatus, the last said means and shelf forming a shelfway extending transversely to the height of said elevator shaft, whereby an automobile can be driven into the apparatus via the shelfway, and parked on the shelf thereof and then transferred to another shelf by moving said conveyor to the level of the shelfway and thence horizontally under the parked automobile and then raising the conveyor to lift the automobile off the shelf of the shelfway and then moving the conveyor back into the elevator shaft and moving the conveyor to the level of another shelf and moving it horizontally into the shelf and then lowering the conveyor and moving it back into the elevator shaftway leaving the automobile on the last said shelf, and whereby the automobile thus transferred can by the reverse process be returned to the shelfway where it can be driven off, said towers being disposed along side each other with the outsides of the shelves at one side of one tower being adjacent the outsides of the shelves at one side of the adjacent tower, the shelf members in each of the last said shelves being continuous with the shelf members of the adjacent co-level shelf forming therewith a double shelf, the members of each double shelf above said shelfways being supported near their middles by two spaced apart joists running crossways thereof, two columns at each side of the apparatus supporting the ends of said joists, whereby automobiles parked on opposite sides of said double shelves tend to balance one another and to thereby eliminate upward pulls at the bottoms of said columns.

2. Apparatus for parking automobiles comprising a plurality of shelves disposed at vertically spaced levels, each shelf including a plurality of elongated members horizontally spaced apart, the sides of each shelf running transverse to said members and the ends of each shelf being parallel to the lengths of said members, a conveyor comprising a plurality of elongated members horizontally spaced apart and adapted to intermesh with said members of any one of said shelves, means to move the conveyor up and down adjacent the sides of said shelves with the lengths of the conveyor members parallel to the lengths of the shelf members, the space traversed by said conveyor in so moving up and down forming an elevator shaft, means to move said conveyor horizontally back and forth between the elevator shaft and the space occupied by any one of said shelves, means at an end of one of said shelves to support an automobile driven onto and off of the shelf to the ground adjacent the apparatus, the last said means and shelf forming a shelfway, whereby an automobile can be driven into the apparatus via the shelfway and parked on the shelf thereof and then transferred to another shelf by moving said conveyor to the level of the shelfway and thence horizontally under the parked automobile and then raising the conveyor to lift the automobile off the shelf of the shelfway and then moving the conveyor back into the elevator shaft and moving the conveyor to the level of another shelf and moving it horizontally into the shelf and then lowering the conveyor and moving it back into the elevator shaftway leaving the automobile on the last said shelf, and whereby the automobile thus transferred can by the reverse process be returned to the shelfway where it can be driven off, means supporting the members of each shelf above the shelfway at their ends away from the elevator shaft including two spaced joists running crossways of said shelf members, two columns at each side of the apparatus supporting the ends of said joists, and of the apparatus supporting the ends of said joists, and means extending over the top of said shelfway supporting said columns, and guide means along the shelfway to position an automobile driven onto the shelf thereof with its pairs of wheels, referring to the pair on one side of the automobile and the pair on the other side of the automobile, disposed on opposite sides of the vertical row of joists thereabove closest to the elevator shaft, whereby when an automobile is transferred from the shelfway to a shelf thereabove its pairs of wheels will be disposed on opposite sides of the shelf supporting joist closest to the elevator shaftway, thereby to at least partially balance the load on opposite sides of the last said joist and reduce bending moments on the columns supporting said joist and on the members of the shelf.

3. Apparatus for parking automobiles comprising two towers, each tower comprising a plurality of pairs of co-level horizontally spaced shelves, said pairs of shelves being spaced apart vertically, the horizontal spaces between the sides of said shelves defining an elevator shaft, each shelf comprising a plurality of elongated members horizontally spaced apart, the sides of each shelf running transverse to said members and the ends of each shelf being parallel to the lengths of said members, a conveyor comprising a plurality of elongated members horizontally spaced apart and adapted to intermesh with said members of any one of said shelves, means to move the conveyor up and down the elevator shaft adjacent said shelves with the lengths of the conveyor members parallel to the lengths of the shelf members, means to move the conveyor horizontally back and forth between the elevator shaft and the space occupied by any one of said shelves, means at an end of one of said shelves to support an automobile driven onto and off of the shelf to the ground adjacent the apparatus, the last said means and shelf forming a shelfway extending transversely to the height of said elevator shaft whereby an automobile can be driven into the apparatus via the shelfway, and parked on the shelf thereof and then transferred to another shelf by moving said conveyor to the level of the shelfway and thence horizontally under the parked automobile and then raising the conveyor to lift the automobile off the shelf of the shelfway and then moving the conveyor back into the elevator shaft and moving the conveyor to the level of another shelf and moving it horizontally into the shelf and then lowering the conveyor and moving it back into the elevator shaftway leaving the automobile on the last said shelf, and whereby the automobile thus transferred can by the reverse process be returned to the shelfway where it can be driven off, said towers being disposed alongside each other with the outsides of the shelves at one side of one tower being adjacent the outsides of the shelves at one side of the adjacent tower, the shelf members in each of the last said shelves being continuous with the shelf members of the adjacent co-level shelf forming therewith a double shelf, the members of each double shelf above said shelfways being supported near their middles by two spaced apart joists running crossways thereof, two columns at each side of the apparatus supporting the ends of said joists, whereby automobiles parked on opposite sides of said double shelves tend to balance one another and to thereby eliminate upward pulls at the bottoms of said columns, means supporting the shelves in the non-adjacent sides of each of the two towers including two horizontally spaced joists running crossways of the beams of the last said shelves, and two columns at each side of the apparatus in each of the two towers supporting the ends of the last said joists, in each tower the said columns supporting all of said shelves being of H-like section with their webs disposed in the planes of the self-supporting joists, horizontal stringers connecting said column supporting shelves on opposite sides of the elevator shaft and vertical rails connected to said stringers forming means to guide said conveyor when it moves up and down in said elevator shaft, said stringers having H-like sections with their webs horizontal whereby their flanges are parallel to the flanges of said columns to make strong connections therewith and the stringers have maximum resistance to bending in the horizontal plane to give said guide rails maximum support against side sway.

4. Apparatus for parking automobiles comprising two towers, each tower comprising a plurality of pairs of co-level horizontally spaced shelves, said pairs of shelves being spaced apart vertically, the horizontal spaces between the sides of said shelves defining an elevator shaft, each shelf comprising a plurality of elongated members horizontally spaced apart, the sides of each shelf running transverse to said members and the ends of each shelf being parallel to the lengths of said members, a conveyor comprising a plurality of elongated members horizontally spaced apart and adapted to intermesh with said members of any one of said shelves, means to move the conveyor up and down the elevator shaft adjacent said shelves with the lengths of the conveyor members parallel to the lengths of the shelf members, means to move the conveyor horizontally back and forth between the elevator shaft and the space occupied by any one of said shelves, means at an end of one of said shelves to support an automobile driven onto and off of the shelf to the ground adjacent the apparatus, the last said means and shelf forming a shelfway extending transversely to the height of said elevator shaft, whereby an automobile can be driven into the apparatus via the shelfway, and parked on the shelf thereof and then transferred to another shelf by moving said conveyor to the level of the shelfway and thence horizontally under the parked automobile and then raising the conveyor to lift the automobile off the shelf of the shelfway and then moving the conveyor back into the elevator shaft and moving the conveyor to the level of another shelf and moving it horizontally into the shelf and then lowering the conveyor and moving it back into the elevator shaftway leaving the automobile on the last said shelf, and whereby the automobile thus transferred can by the reverse process be returned to the shelfway where it can be driven off, said towers being disposed alongside each other with the outsides of the shelves at one side of one tower being adajcent the outsides of the shelves at one side of the adjacent tower, the shelf members in each of the last said shelves being continuous with the shelf members of the adjacent co-level shelf forming therewith a double shelf, the members of each double shelf above said shelfways being supported near their middles by two spaced apart joists running crossways thereof, two columns at each side of the apparatus supporting the ends of said joists, whereby automobiles parked on opposite sides of said double shelves tend to balance one another and to thereby eliminate upward pulls at the bottoms of said columns, at least one of said shelfways being disposed beneath said double shelves, means bridging over said shelfway supporting the columns that support said double shelves, and means supporting said bridging means disposed at the side of said shelfway opposite from the elevator shaft adjoining said shelfway, whereby automobiles can be driven onto said shelfway in position to be transferred to a shelf thereabove with the side pairs of wheels thereof on opposite sides of the shelf supporting joist nearest the elevator shaft, thereby to balance the load on the members of the shelf and reduce the bending moments on said members and the columns supporting said members.

5. Apparatus for parking automobiles comprising two towers, each tower comprising a plurality of pairs of co-level horizontally spaced shelves, said pairs of shelves being spaced apart vertically, the horizontal spaces between the sides of said shelves defining an elevator shaft, each shelf comprising a plurality of elongated members horizontally spaced apart, the sides of each shelf running transverse to said members and the ends of each shelf being parallel to the lengths of said members, a conveyor comprising a plurality of elongated members horizontally spaced apart and adapted to intermesh with said members of any one of said shelves, means to move the conveyor up and down the elevator shaft adjacent said shelves with the lengths of the conveyor members parallel to the lengths of the shelf members, means to move the conveyor horizontally back and forth between the elevator shaft and the space occupied by any one of said shelves, means at an end of one of said shelves to support an automobile driven onto and off of the shelf to the ground adjacent the apparatus, the last said means and shelf forming a shelfway extending transversely to the height of said elevator shaft, whereby an automobile can be driven into the apparatus via the shelfway, and parked on the shelf thereof and then transferred to another shelf by moving said conveyor to the level of the shelfway and thence horizontally under the parked automobile and then raising the conveyor to lift the automobile off the shelf of the shelfway and then moving the conveyor back into the elevator shaft and moving the conveyor to the level of another shelf and moving it horizontally into the shelf and then lowering the conveyor and moving it back into the elevator shaftway leaving the automobile on the last said shelf, and whereby the automobile thus transferred can by the reverse process be returned to the shelfway where it can be driven off, said towers being disposed alongside each other with the outsides of the shelves at one side of one tower being adjacent the outsides of the shelves at one side of the adjacent tower, the shelf members in each of the last said shelves being continuous with the shelf members of the adjacent co-level shelf forming therewith a double shelf, the members of each double shelf above said shelfways being supported near their middles by two spaced apart joists running crossways thereof, two columns at each side of the apparatus, supporting the ends of said joists, whereby automobiles parked on opposite sides of said double shelves tend to balance one another and to thereby eliminate upward pulls at the bottoms of said columns, there being in each tower a second shelfway below the first mentioned shelfway, the shelfways in each tower being at the same side of the elevator shaft of the tower, e. g. the left side, said shelves other than those forming shelfways constituting parking shelves, and a ramp below the parking shelves on the right side of the right hand tower leading down from the front of the apparatus to a turning area at the back of the apparatus at the level of the lower shelfways, said ramp and turning area forming part of the lower shelfways, said means at an end of one of said shelves in each tower for supporting an automobile driven onto the shelf and forming therewith the first mentioned upper shelfway connecting to the ground at the front of the apparatus, whereby automobiles can be driven into said apparatus at the front thereof on one of said shelfways, e. g. a lower one via the ramp and turning area and transferred to parking shelf and returned to one of the upper shelfways and driven out the front of the apparatus, and vice-versa.

References Cited in the file of this patent

UNITED STATES PATENTS

| | | |
|---|---|---|
| 493,542 | Bessing et al. | Mar. 14, 1893 |
| 1,369,393 | Burgess | Feb. 22, 1921 |
| 1,584,080 | Dinkelberg | May 11, 1926 |
| 1,605,220 | Cuvillier et al. | Nov. 2, 1926 |
| 1,748,656 | Saemisch | Feb. 25, 1930 |
| 1,788,155 | Geiger | Jan. 6, 1931 |
| 1,804,338 | Henderson | May 5, 1931 |
| 1,874,859 | Been | Aug. 30, 1932 |
| 2,230,635 | Alderfer | Feb. 4, 1941 |
| 2,280,567 | Austin | Apr. 21, 1942 |
| 2,285,232 | Sheehan | June 2, 1942 |
| 2,598,413 | Morley | May 27, 1952 |
| 2,647,647 | Alimanestiano | Aug. 4, 1953 |
| 2,722,322 | Gunderson | Nov. 1, 1955 |

FOREIGN PATENTS

| | | |
|---|---|---|
| 248,758 | Great Britain | Feb. 3, 1927 |